US 8,851,051 B2

(12) United States Patent
Ziegler et al.

(10) Patent No.: US 8,851,051 B2
(45) Date of Patent: Oct. 7, 2014

(54) FUEL SUPPLY SYSTEM FOR AN INTERNAL COMBUSTION ENGINE

(75) Inventors: Thomas Ziegler, Steinheim an der Murr (DE); Giuseppe Motolese, Grottaglie (IT)

(73) Assignee: Robert Bosch GmbH, Stuttgart (DE)

( * ) Notice: Subject to any disclaimer, the term of this patent is extended or adjusted under 35 U.S.C. 154(b) by 337 days.

(21) Appl. No.: 13/387,529

(22) PCT Filed: Jul. 2, 2010

(86) PCT No.: PCT/EP2010/059468
§ 371 (c)(1),
(2), (4) Date: Feb. 15, 2012

(87) PCT Pub. No.: WO2011/012402
PCT Pub. Date: Feb. 3, 2011

(65) Prior Publication Data
US 2012/0132178 A1    May 31, 2012

(30) Foreign Application Priority Data

Jul. 29, 2009    (IT) .............................. MI2009A1355

(51) Int. Cl.
*F02M 55/02*    (2006.01)
*F02M 37/00*    (2006.01)
*F16L 47/24*    (2006.01)
*F02M 55/00*    (2006.01)
*F16L 25/10*    (2006.01)
*F16L 23/00*    (2006.01)
*F02M 55/04*    (2006.01)

(52) U.S. Cl.
CPC ............ *F02M 37/0017* (2013.01); *F16L 47/24* (2013.01); *F02M 55/004* (2013.01); *F16L 25/10* (2013.01); *F16L 23/00* (2013.01); *F02M 37/0047* (2013.01)
USPC .......................................... 123/469; 123/468

(58) Field of Classification Search
CPC .. F02M 37/0017; F02M 55/004; F16L 25/10; F16L 47/24; F16L 23/00
USPC ................. 123/468, 469, 456, 514, 461, 450; 285/363, 369, 305, 348, 405, 414
See application file for complete search history.

(56) References Cited

U.S. PATENT DOCUMENTS 4,776,616 A * 10/1988 Umehara et al. ......... 285/133.21
5,087,083 A *  2/1992 Usui et al. .................... 285/21.1
(Continued)

FOREIGN PATENT DOCUMENTS

JP    2000081183    3/2000
WO   2008043755    4/2008
WO   2009053345    4/2009

OTHER PUBLICATIONS

PCT/EP2010/059468 International Search Report, 4 pages.

*Primary Examiner* — Mahmoud Gimie
(74) *Attorney, Agent, or Firm* — Michael Best & Friedrich LLP

(57) ABSTRACT

System for supplying fuel from a tank (2) to a manifold (5) that distributes fuel into an engine (3); the system (1) having a pumping unit which connects together the tank (2) and the manifold (5) and has a fluid line (11) with a first or low-pressure portion (P1), a second or high-pressure portion (P2), a high-pressure pump (9) connecting together the first and second portions (P1, P2); the first portion (P1) having a plurality of low-pressure branches (23-28, 30-34), a plurality of fluid components (8, 13, 21, 29, 231, 232, 233, 241, 242, 251, 261, 271, 311), each of which has at least one connector (36) and at least one tubular coupling (40; 140; 340; 440), which latter is inserted partly into the connector (36) and partly into a low-pressure branch (23-28; 30-34); each coupling (40; 140; 340; 440) having a plastic tubular body (145; 345; 445).

20 Claims, 4 Drawing Sheets

(56) References Cited

U.S. PATENT DOCUMENTS

| | | | |
|---|---|---|---|
| 5,346,262 A * | 9/1994 | Liebig | 285/23 |
| 5,909,902 A | 6/1999 | Seabra | |
| 6,619,343 B2 * | 9/2003 | Stoddart et al. | 141/286 |
| 6,792,915 B2 | 9/2004 | Rembold et al. | |
| 7,044,110 B2 | 5/2006 | Geyer | |
| 7,219,654 B2 | 5/2007 | Ludwig et al. | |
| 7,718,287 B2 | 5/2010 | Sparschuh et al. | |
| 8,167,339 B2 | 5/2012 | Yagisawa et al. | |
| 2002/0053567 A1 | 5/2002 | Beyer et al. | |
| 2002/0130515 A1 * | 9/2002 | Mlyajima et al. | 285/201 |
| 2008/0042435 A1 | 2/2008 | Athalye et al. | |

* cited by examiner

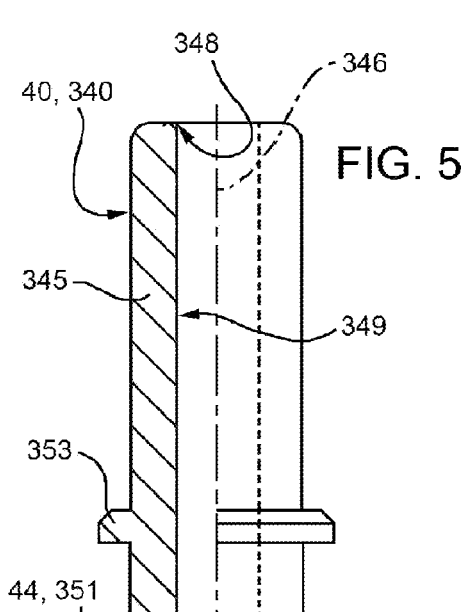
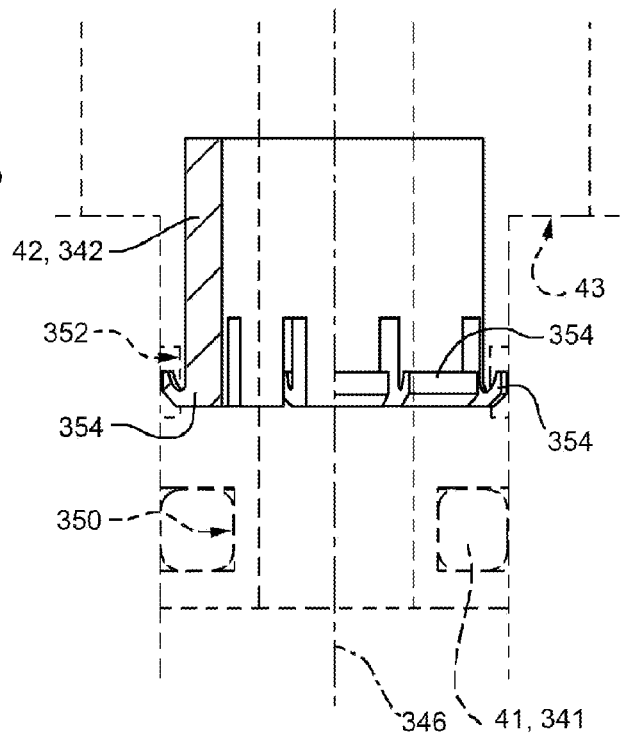
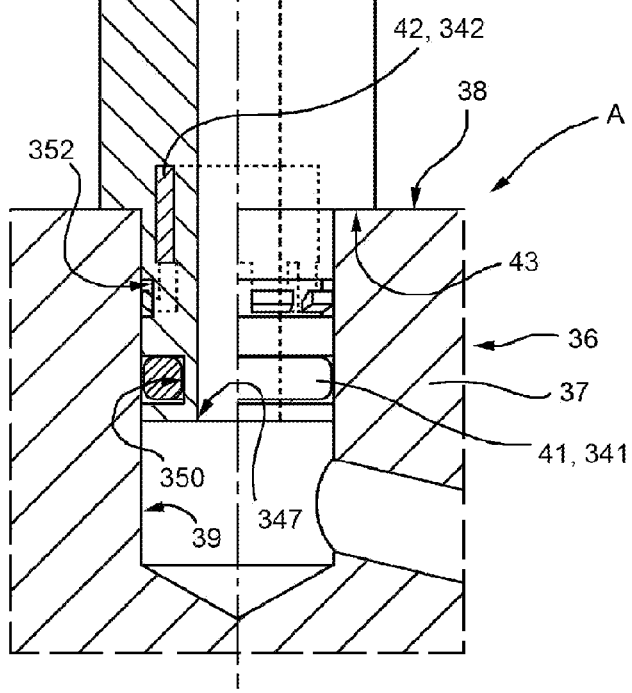
FIG. 5
FIG. 6

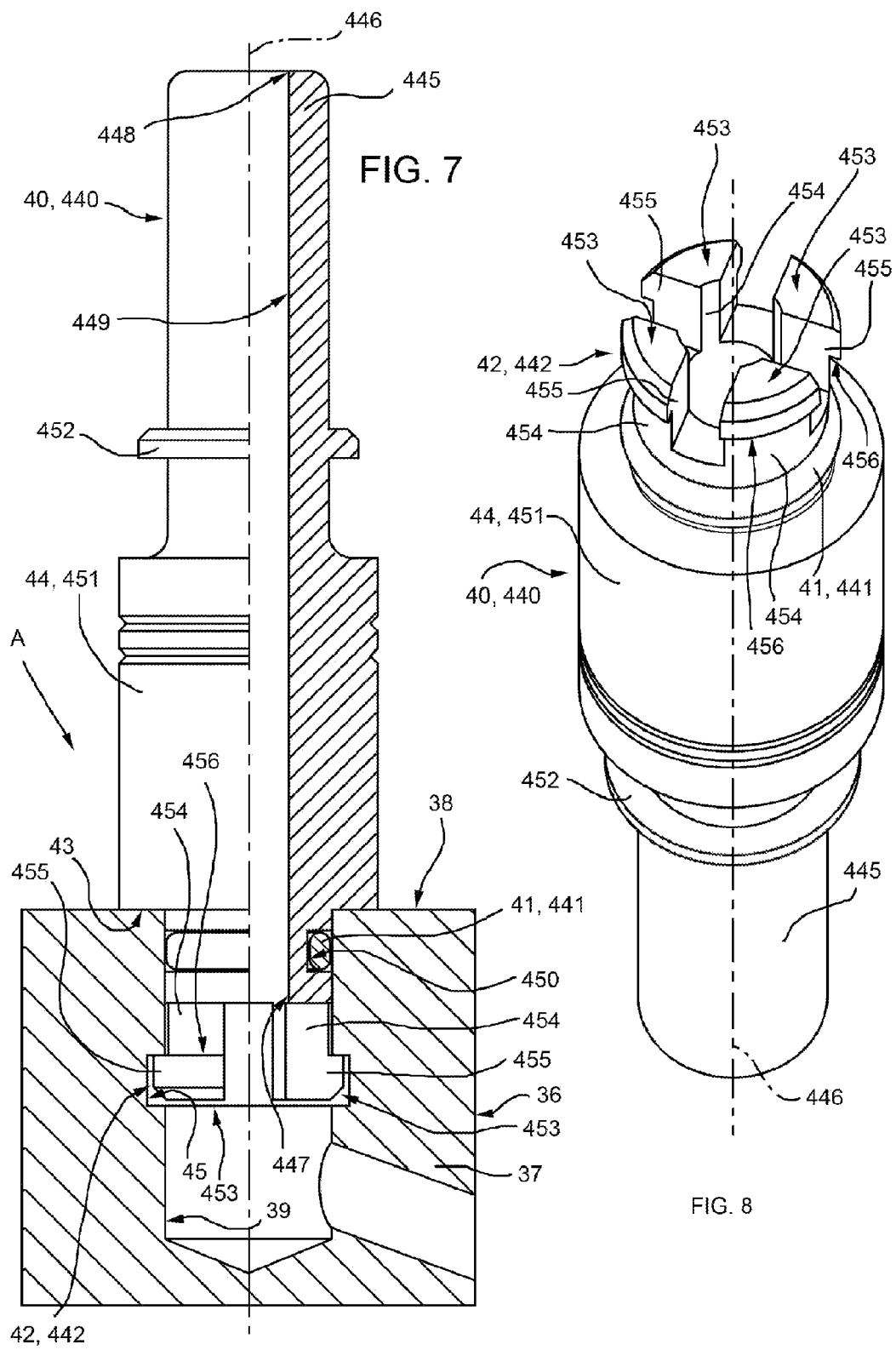

FUEL SUPPLY SYSTEM FOR AN INTERNAL COMBUSTION ENGINE

BACKGROUND OF THE INVENTION

The present invention relates to a fuel supply system for an internal-combustion engine, especially for supplying diesel to an endothermic diesel-cycle engine installed in a motor vehicle.

A system of the type described above generally comprises, in the prior art, a fuel supply tank (at low pressure) and a fuel distribution manifold (at high pressure), from which the fuel is fed into the engine through a plurality of injectors.

The fuel supply tank and the distribution manifold are connected to each other by a pumping unit in which a fluid line comprises a low-pressure portion and a high-pressure portion. These portions are connected by a high-pressure pump. The low-pressure portion comprises a pre-feed pump mounted in series with the high-pressure pump on the aforementioned fluid line.

The low-pressure portion also includes a plurality of low-pressure branches and a plurality of fluid-line components, each of which is connected to at least one low-pressure branch by a connector provided with a coupling inserted partly into the connector and partly into the low-pressure branch.

The couplings mentioned above are usually made of metal and are fixed inside their connectors by screwing or pressure; in this second case the couplings are usually made of brass.

A system such as that described above has the drawback that the metal couplings are heavy and, in the case of screw couplings, the couplings and their connectors require expensive machining by chip removal.

In the case of brass couplings there is the drawback that Zn and Cu ions from the coupling itself dissolve into the fuel causing both internal abrasion of the pumping unit and deposition, inside the injectors, of hard sediments, which reduce the flow rate and uniformity of the distribution of the fuel entering the engine.

SUMMARY OF THE INVENTION

It is an object of the present invention to provide an internal-combustion engine fuel supply system capable of eliminating the drawbacks described above.

BRIEF DESCRIPTION OF THE DRAWINGS

The invention will now be described with reference to the appended drawings, which show certain non-restrictive examples of embodiments thereof, in which:

FIG. 5 is similar to FIG. 3 and shows a second variant of the detail seen in FIG. 2;

FIG. 6 is a half-cross section on an enlarged scale of a detail seen in FIG. 5;

FIG. 7 is similar to FIG. 3 and shows a third variant of the detail seen in FIG. 2; and FIG. 8 is a perspective view of the detail seen in FIG. 7.

DETAILED DESCRIPTION

Figure 1:
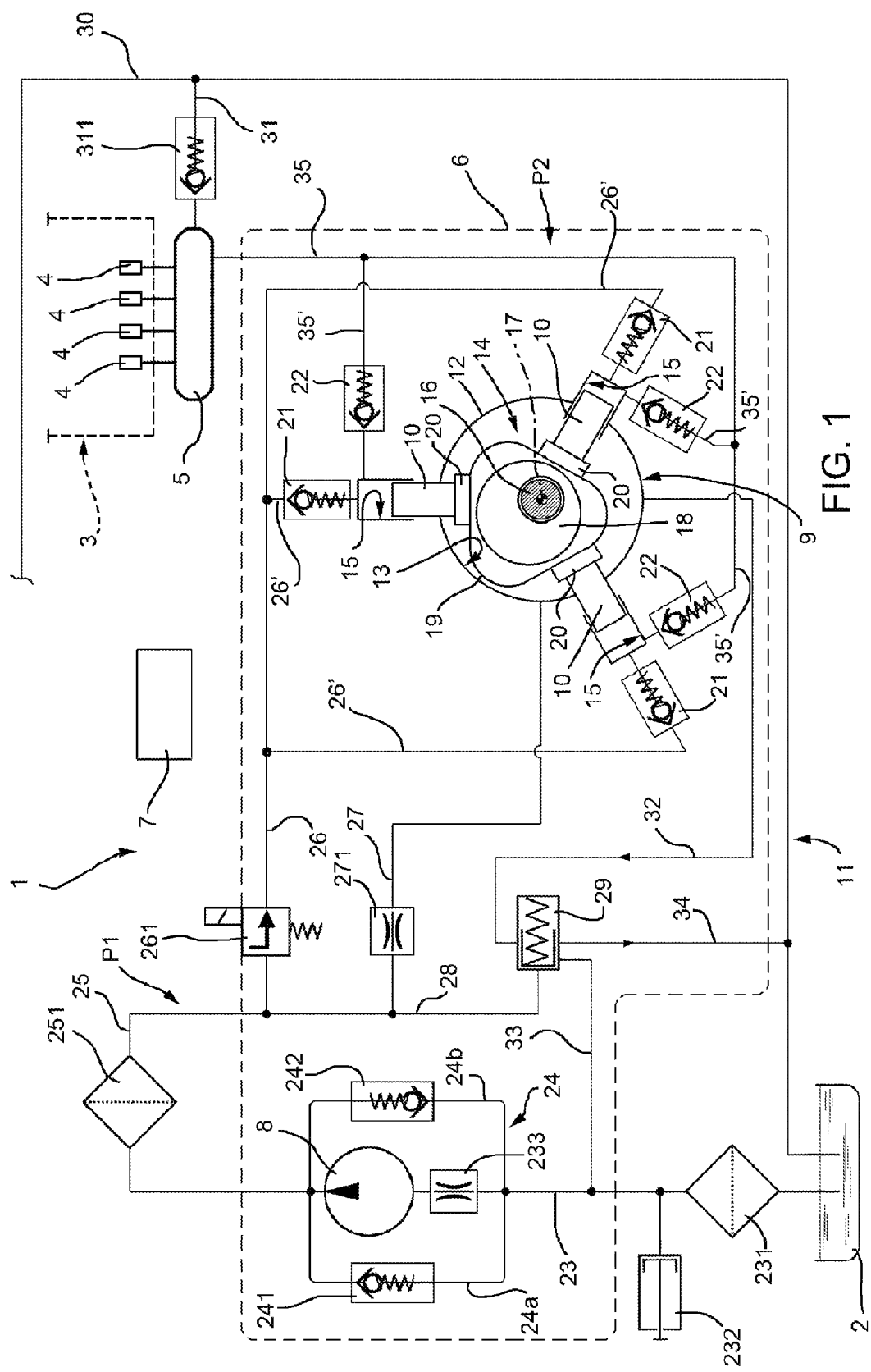
FIG. 1 is a diagrammatic view, with parts removed for clarity, of a preferred embodiment of the system of the present invention.

In FIG. 1, the number 1 is a general reference for a system for supplying fuel, basically diesel, from a tank 2 to an internal-combustion engine 3, especially to a diesel-cycle engine 3.

The engine 3 comprises fuel supply injectors 4 downstream of a manifold 5 defined by a container usually called the "common rail", which distributes the fuel. The manifold 5 is designed to contain the fuel at a pressure preferably, but not necessarily, greater than 2000 bar.

The system 1 comprises a pumping unit 6 for pumping the fuel from the tank 2 to the manifold 5, and a control device 7 for regulating the flow of fuel through the system 1 on the basis of the demand of the engine 3 for fuel, instant by instant.

In turn, the pumping unit 6 comprises a pre-supply pump 8, preferably a gear pump, and a high-pressure pump 9, preferably a positive-displacement piston pump 10. These pumps are arranged in series on a fluid line 11 that connects the tank 2 to the manifold 5 via the pumping unit 6.

The high-pressure pump 9 comprises a pump casing 12 containing a volume 13, preferably of circular section, for the partial housing of a drive mechanism 14 for the pistons 10 which, as will be explained later in more detail, are connected to the drive mechanism 14. Inside the volume 13 are opposing cavities 15, each containing the axially sliding fluid-tight free end of a respective piston 10. Generally speaking, both the pistons 10 and the cavities 15 are of circular section.

The drive mechanism 14 comprises a shaft 16 mounted so as to be rotatable about an axis 17 and comprises an eccentric portion 18 on which a polygonal ring 19 is mounted so as to rotate freely.

The shaft 16 is mounted rotatably inside the pump casing 12 on support bearings or brasses (not shown), of known type, arranged on opposite sides of the volume 13. The mounting of the shaft 16 inside the pump casing 12 is of known type and also includes seals of known type (not shown) to prevent fuel leaking out of the pump casing 12. A shaft 16 is furthermore connected, in a manner known per se and not shown, to the output drive shaft of the engine 3 and, in a preferred embodiment (not shown), is also connected to the pre-supply pump 8, which is powered by the shaft 16 together with the high-pressure pump 9.

Each piston 10 has a sliding connection, via a respective intermediate element or slider 20, to a respective peripheral planar surface of the polygonal ring 19, which when in use rotates translationally about the shaft 16. The sliding of its slider 20 against its corresponding peripheral planar surface means that the rotation of the shaft 16 about its axis 17 corresponds to a reciprocal axial movement of each piston 10 in its own radial direction with respect to the axis 17 along its particular cavity 15.

The pistons 10, of which there are three in the example illustrated, although there could be a different number of pistons, are distributed at equal intervals around the axis 17.

Each cavity 15 communicates with the fluid line 11 through a supply valve 21 and a delivery valve 22, which are built into the pump casing 12 and are of known type.

The fluid line 11 comprises a low-pressure portion P1 and a high-pressure portion P2.

In more detail, the low-pressure portion P1 comprises:

a connecting branch 23 connecting the tank 2 to an inlet of the pre-supply pump 8; connected in series along the connecting branch 23 are a pre-filter 231, a manual priming pump 232 and a fluid resistance 233 which has an accurately sized hole;

a complex 24 of by-pass branches, particularly two by-pass branches marked 24a and 24b connected to the connecting branch 23 upstream of the pre-supply pump 8 and capable of bypassing the pre-supply pump 8 in different directions of flow depending on the conditions of use; the by-pass branches 24a and 24b each comprising a nonreturn valve 241, 242, respectively;

a filter branch 25 connected to an outlet of the pre-supply pump 8 and to the bypass branches 24a and 24b, which filter branch 25 passes through a filter 25;

a distribution branch 26 for receiving the fuel from the filter branch 25, comprising a metering valve 261 and a plurality of branches 26' each downstream of the metering valve 261 and connected to a respective supply valve 21 supplying the high-pressure pump 9;

a delivery branch 27, which is connected to the filter branch 25 parallel to the distribution branch 26, passes through a fluid resistance 271 containing an accurately sized hole, and leads into the internal volume 13 of the high-pressure pump 9;

a regulating branch 28 which is connected to the filter branch 25 parallel to the distribution branch 26 and the delivery branch 27 and leads to an overflow valve 29;

a collecting branch 30 for recycling fuel from the engine 3 to the tank 2;

an outlet branch 31 from the manifold 5, leading to the collecting branch 30 and controlled by a non-return valve 311 designed to keep the pressure in the manifold 5 below a predetermined maximum value;

a return branch 32 which is connected to the outlet of the internal volume 13 of the high-pressure pump 9 and leads to the overflow valve 29;

a recycling branch 33 connected to the outlet of the overflow valve 29 and leading to the connecting branch 23; and a recycling branch 34 connected to the outlet of the overflow valve 29 and leading to the collecting branch 30.

The high-pressure portion P2 comprises:

a plurality of high-pressure branches 35' each connected downstream of a respective delivery valve 22 of the high-pressure pump 9; the high-pressure branches 35' leading to a single high-pressure branch 35 that supplies the manifold 5.

In a preferred embodiment (not shown), the pre-supply pump 8 and the high-pressure pump 9 are inserted into a common pump casing, in which the branches of the fluid line 11 are made by removal of material.

Along the low-pressure portion P1 are a plurality of attachment devices A for connecting the fluid components described above to the low-pressure branches.

Each attachment device A comprises a connector 36 formed on a corresponding fluid component and comprising a cylindrical body 37 having a free end surface 38 and a longitudinal cylindrical housing 39 formed axially inside the body 37 and extending from the free end surface 38.

Each attachment device A also comprises a coupling 40 inserted partly into the connector 36 and partly into a low-pressure branch 23-28 and 30-34. Each coupling 40 comprises at least one seal 41 (only one seal 41 is shown in the example illustrated, but two or more seals 41 can also be used in succession, in examples which are not illustrated) and at least one connecting element 42 inserted into the cylindrical housing 39 of the corresponding connector 36 in an axial position defined by its contact with a generally annular shoulder 43 on its own stop element 44 with the free end surface 38 of the body 37 of the connector 36.

Figure 2:
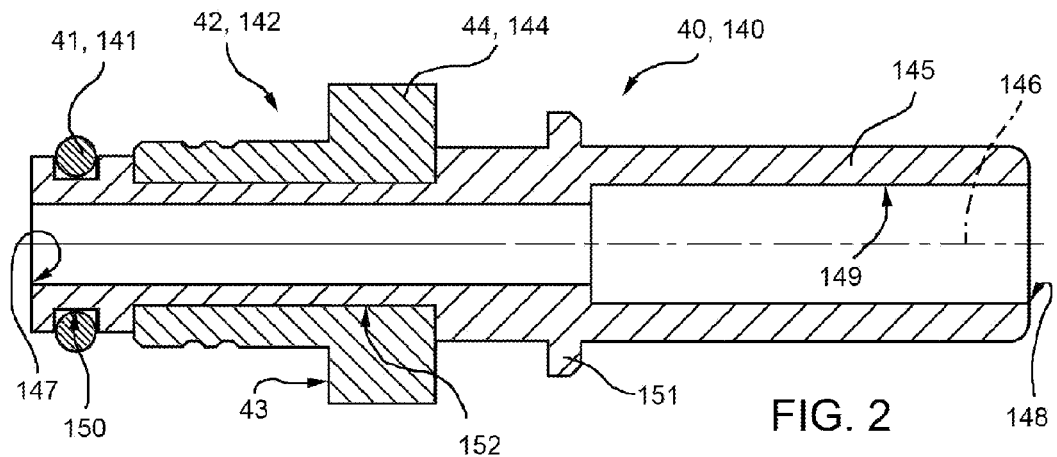
FIG. 2 is a longitudinal section through a preferred embodiment of one detail of FIG. 1.
Figure 3:
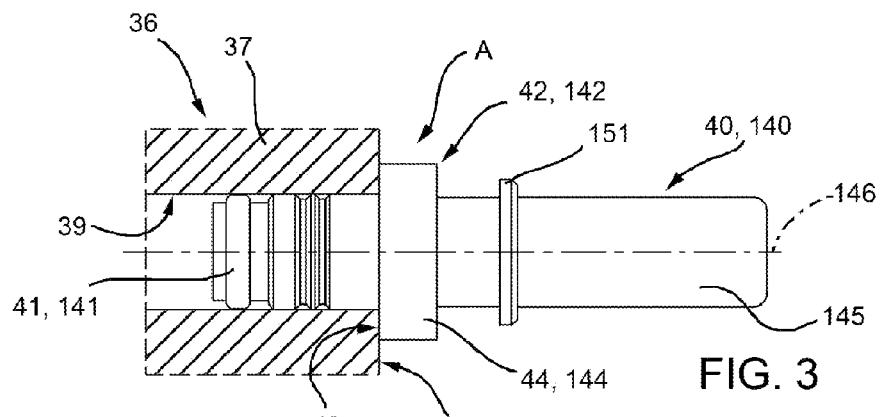
FIG. 3 is a side view, partially in section and with parts removed for clarity, of the details seen in FIG. 2 in a working configuration.

FIGS. 2 and 3 illustrate a first embodiment of the attachment device A, in which coupling 40, which in this embodiment is marked 140 comprises a plastic tubular body 145 on which are fitted, as will be explained in more detail below, a seal 141 and a connecting element 142 of metallic material, preferably brass.

The tubular body 145 has a longitudinal axis 146 and two axial openings marked 147, 148, each formed at a corresponding free end of the tubular body 145. The axial openings 147 and 148 allow communication between the exterior and a longitudinal cylindrical internal cavity 149 of the tubular body 145 and define the ports through which the coupling 140 allows intercommunication between the components of the low-pressure portion P1 of the fluid line 11.

As shown in FIG. 2, the internal cavity 149 is divided into two longitudinal sections having different diameters from each other, and also the axial apertures 147 and 148 are different and, preferably, are circular and have a diameter equivalent to that of the longitudinal section of the cavity 149 to which they lead. In particular, the axial aperture 147 leads into the smaller-diameter longitudinal section of the cavity 149.

The tubular body 145 has an external annular groove 150 which is next to the axial aperture 147 and houses the seal 141, which is of known type and of toroidal shape. The tubular body 145 also has an external annular flange 151 in an intermediate part of the tubular body 145, particularly a part where the diameter of the cavity 149 varies; and an annular groove 152 which is between the groove 150 and the flange 151 and houses the connecting element 142.

Figure 4:
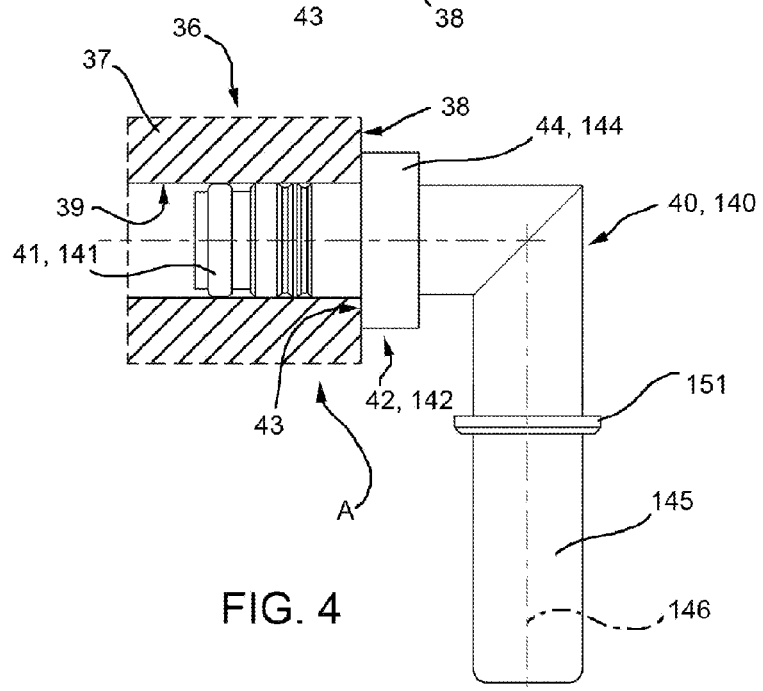
FIG. 4 is similar to FIG. 3 and shows a first variant of the detail seen in FIG. 2.

In the embodiment shown in FIGS. 2 to 4, the connecting element 142 is a tubular sleeve, is coaxial with the axis 146, has an external annular flange 144 at its free end nearest the flange 151, and has two external annular grooves.

The flange 144 defines, on the coupling 140, the stop element 44 of the generic coupling 40; while the seal 141 and the connecting element 142 corresponds to the seal 41 and to the connecting element 42, respectively, of the generic coupling 40.

The seal 141 and the connecting element 142 are an interference fit between the housing 39 of the connector 36 and the tubular body 145 of the coupling 140.

FIG. 5 depicts another embodiment of the attachment device A, in which the coupling 40, which in this embodiment is marked 340, comprises a plastic tubular body 345, a seal 341 and a connecting element 342.

The tubular body 345 has a longitudinal axis 346 and two axial apertures 347 and 348, each of which is made at a respective free end of the tubular body 345. The axial apertures 347 and 348 lead into an internal cavity 349 of cylindrical shape and define the ports through which the coupling 340 allows intercommunication between the components of the low-pressure portion P1 of the fluid line 11.

The tubular body 345 has an external annular groove 350 which is next to the axial aperture 347 and houses the seal 341, which is of known type and of essentially toroidal shape; an enlarged external annular portion 351 located in an intermediate part of the tubular body 345 and having a plurality of external annular grooves, especially two; an annular groove 352 interposed between the groove 350 and the enlarged portion 351 and housing, as will be explained in more detail later, an external peripheral portion of the connecting element 342; and a flange 353 between the enlarged portion 351 and the axial aperture 348.

As illustrated in FIG. 6, the connecting element 342 is a ring, that is a metal sleeve preferably made of spring steel, which is coaxial with the axis 346 and which ends, at its free end, in a plurality of teeth 354. The teeth are basically hook-shaped and are bent radially into a U towards the outside of the connecting element 342. In particular, the connecting element 342 is partially enclosed within the tubular body 345 so that the teeth 354 project out from the tubular body 345 within the groove 352.

The enlarged portion 351 defines on the coupling 340 the stop element 44 of the generic coupling 40; while the seal 341 and the connecting element 342 correspond to the seal 41 and the connecting element 42, respectively, of a generic coupling 40.

The seal 341 and the connecting element 342 are an interference fit between the housing 39 of the connector 36 and the tubular body 345. The coupling 340 is preferably fitted to connectors 36 made of aluminium.

FIG. 7 shows another embodiment of the attachment device A, in which the coupling 40, which in this embodiment is marked 440, comprises a plastic tubular body 445, a plastic connecting element 442 projecting from a free end of the tubular body 445, and a seal 441 which is fitted, as will be described in more detail later, around the tubular body 445.

The tubular body 445 has a longitudinal axis 446 and two axial apertures marked 447 and 448 at a free end of the tubular body 445; the axial apertures 447 and 448 lead into a cylindrical internal cavity 449 and define the ports through which the coupling 440 allows communication between the components of the low-pressure portion P1 of the fluid line 11. The tubular body 445 has an annular external groove 450 which is next to the axial aperture 447 and houses the seal 441, which is of a known type and essentially toroidal; an enlarged annular portion 451, which is in an intermediate portion of the tubular body 445 and has a plurality of annular grooves, in particular two mutually parallel annular grooves; and a flange 452 between the enlarged portion 451 and the axial aperture 448.

The connecting element 442 is made integrally on the tubular body 445, projects (FIG. 8) from this tubular body 445, at the free end of which is the axial aperture 447, and comprises a plurality of identical hooked teeth 453 distributed at equal angular intervals around the axis 446. Each hooked tooth 453 has a basically elastic base leg 454 parallel to the axis 446, at the free end of which is a hooked appendage 455 projecting radially outwards from the base leg 454 with a shoulder surface 456 facing towards the enlarged portion 451. In particular, each hooked tooth 453 is defined by a plate integral with the free end of its base leg 454, perpendicular to the axis 446 and shaped as a sector of a circular annulus with an aperture to approximately 45 degrees projecting radially outwards and snap-engaged, when in use, in a groove 45, which is formed around the perimeter of the cylindrical housing 39 and is radially next to the inside of the connector 36, in order to lock the coupling 440 axially in its connector 36.

The enlarged portion 451 defines on the coupling 440 the stop element 44 of the generic coupling 40; while the seal 441 and the connecting element 442 correspond to the seal 41 and the connecting element 42, respectively, of a generic coupling 40.

The connecting element 442 engages by snap action with the groove 45.

Attachment devices A are preferably arranged at the inlet of the pre-supply pump 8 and on the connectors 36 of the collecting branch 30. In the latter case the use of an attachment device A is strongly advised because fuel returning to the tank 2 is hot and will encourage chemical processes in the tank 2 caused by the presence of Zn and Cu ions which will cause deterioration to the quality of the fuel.

The tubular body 145, 345 and 445 may be straight, or it may be L-shaped (FIG. 4) in order to provide an angled connection and connect up pipes arranged at right angles to each other. This type of attachment device A can be used instead of commonly known Banjo couplings.

The couplings 40, 140, 340 and 440 are inserted, as described earlier, with one end into a respective connector 36 and the other end into a respective low-pressure branch 23-28, 30-34. The shape and size of the tubular body 145, 345 or 445 are decided on the basis of the shape and size of the corresponding low-pressure branch into which it is inserted.

It is stressed that the coupling 140 or 340 is fixed inside the coupling 36 by interference with the housing 39, and the corresponding connecting element 142 or 342 is of metallic material; while the coupling 440, which comprises a plastic connecting element 442, is fixed to the connector 36 by snap action.

The 140 type of coupling 40 is preferably used instead of known pressure couplings 40, which usually have an all-brass body, while the 340 and 440 type of couplings 40 are mostly used instead of screw couplings, which usually have threaded steel bodies.

It is important to stress that the couplings 140, 340 and 440 can be connected by simply inserting them into a corresponding connector 36, reducing assembly times and costs.

It follows from the above account that the couplings 140, 340 and 440 are lighter and cheaper than corresponding known couplings; and, because of their plastic tubular body 145, 345 or 445, they prevent contact of the fuel with metallic components, especially brass components, which contain alloys of Zn and Cu.

The L-shaped tubular body 145, 345 or 445 allows connections to be made between mutually transverse components, avoiding the use of known Banjo type couplings, which are usually made of metal and are expensive to manufacture.

What is claimed is:

1. A fuel supply system for an internal-combustion engine (3) in which the system (1) comprises a fuel supply tank (2), a fuel distribution manifold (5), and a pumping unit (6) which connects together the fuel supply tank (2) and the fuel distribution manifold (5); the pumping unit (6) comprising a fluid line (11) having a first, low-pressure portion (P1), a second, high-pressure portion (P2), a high-pressure pump (9) connecting together the first and second portions (P1, P2), and a pre-supply pump (8) connected to the first portion (P1); and the first portion (P1) comprising a plurality of low-pressure branches (23-28, 30-34), a plurality of fluid components (8, 13, 21, 29, 231, 232, 233, 241, 242, 251, 261, 271, 311), each of which has at least one connector (36) and at least one tubular coupling (40; 140; 340; 440), which tubular coupling is inserted partly into the connector (36) and partly into one of said low-pressure branches (23-28; 30-34) to connect together the component (8; 13; 21; 29; 231; 232; 233; 241; 242; 251; 261; 271; 311) and the low-pressure branch (23-28; 30-34); the system (1) being characterized in that each coupling (40; 140; 340; 440) comprises a plastic tubular body (145; 345; 445), sealing means (41; 141; 341; 441) interposed between the tubular body (145; 345; 445) and the corresponding connector (36), and means (42; 142; 342; 453) for axial locking of the tubular body (145; 345; 445) with respect to its connector (36) in a defined axial position, each coupling (40; 140; 340; 440) comprising axial stop means (44; 144; 351; 451) for the tubular body (145; 345; 445) with respect to its connector (36) in said defined axial position, the connector (36) having an end surface (38) and a cylindrical housing (39)

which begins at the end surface (38) and houses part of its coupling (40; 140;340; 440), the sealing means (41; 141; 341; 441) and the locking means (42; 142; 342; 453), the cylindrical housing (39) having an annular groove (45), the axial locking means (42; 142; 342; 453) being snap-action locking means (453) engaging with said groove (45) and being made in one piece with the tubular body (445).

2. The system according to claim 1, in which said stop means (44; 144; 351; 451) comprise, on the coupling (40; 140; 340; 440), an annular shoulder (43) that interacts with the end surface (38) of the connector (36).

3. The system according to claim 1, in which the axial locking means (42; 142; 342; 442) are interference-fit means on the tubular body (145; 345; 445) that engage with the cylindrical housing (39).

4. The system according to claim 3, in which the axial locking means (142; 342) are made of metal.

5. The system according to claim 3, in which the axial locking means (142; 342) comprise a sleeve mounted in a fixed position on the tubular body (145; 345) and projecting radially outwards from said tubular body (145; 345).

6. The system according to claim 2, in which said shoulder (43) is formed on a sleeve mounted in a fixed position on the tubular body (145; 345) and projecting radially outwards from said tubular body (145; 345).

7. The system according to claim 3, in which the axial locking means (442) comprise an annulus of elastically deformable teeth (453) projecting radially outwards from the tubular body (445).

8. The system according to claim 1, in which the snap-action locking means (442) are made of plastic.

9. The system according to claim 1, in which the tubular body (145; 345; 445) is straight.

10. The system according to claim 1, in which the tubular body (145; 345; 445) is bent essentially into an L shape.

11. A coupling for connecting a fluid component (8; 13; 21; 29; 231; 232; 233; 241; 242; 251; 261; 271; 311) to a low-pressure branch (23-28, 30-34) of a fuel supply system (1) of an internal-combustion engine (3), the fluid component (8; 13; 21; 29; 231; 232; 233; 241; 242; 251; 261; 271; 311) having a connector (36), the coupling (40; 140; 340; 440) comprising:
 a plastic tubular body (145; 345; 445);
 a sealing arrangement (41; 141; 341; 441) interposed between the tubular body (145; 345; 445) and the connector (36); and
 an axial locking arrangement (42; 142; 342; 453) for axial locking of the tubular body (145; 345; 445) with respect to the connector (36) in a defined axial position, each coupling (40; 140; 340; 440) comprising an axial stop arrangement (44; 144; 351; 453) for the tubular body (145; 345; 445) with respect to its connector (36) in said defined axial position, the connector (36) having an end surface (38) and a cylindrical housing (39) which begins at the end surface (38) and houses part of its coupling (40; 140; 340; 440), the sealing arrangement (41; 141; 341; 441) and the axial locking arrangement (42; 142; 342; 453), the cylindrical housing (39) having an annular groove (45), the axial locking arrangement (42; 142; 342; 453) being a snap-action arrangement (453) engaging with said groove (45) and being made in one piece with the tubular body (445).

12. The coupling according to claim 11, in which the stop arrangement (44; 144; 351; 451) comprises, on the coupling (40; 140; 340; 440), an annular shoulder (43) that interacts with an end surface (38) of the connector (36).

13. The coupling according to claim 12, in which the annular shoulder (43) is formed on a sleeve mounted in a fixed position on the tubular body (145; 345) and projecting radially outwards from said tubular body (145; 345).

14. The coupling according to claim 11, in which the axial locking arrangement (142; 342) comprises a sleeve mounted in a fixed position on the tubular body (145; 345) and projecting radially outwards from said tubular body (145; 345).

15. The coupling according to claim 11, in which the axial locking arrangement (442) comprises an annulus of elastically deformable teeth (453) projecting radially outwards from the tubular body (445).

16. A fuel supply system for an internal-combustion engine (3) in which the system (1) comprises a fuel supply tank (2), a fuel distribution manifold (5), and a pumping unit (6) which connects together the fuel supply tank (2) and the fuel distribution manifold (5); the pumping unit (6) comprising a fluid line (11) having a first, low-pressure portion (P1), a second, high-pressure portion (P2), a high-pressure pump (9) connecting together the first and second portions (P1, P2), and a pre-supply pump (8) connected to the first portion (P1); and the first portion (P1) comprising a plurality of low-pressure branches (23-28, 30-34), a plurality of fluid components (8, 13, 21, 29, 231, 232, 233, 241, 242, 251, 261, 271, 311), each of which has at least one connector (36) and at least one tubular coupling (40; 140; 340; 440), which tubular coupling is inserted partly into the connector (36) and partly into one of said low-pressure branches (23-28; 30-34) to connect together the component (8; 13; 21; 29; 231; 232; 233; 241; 242; 251; 261; 271; 311) and the low-pressure branch (23-28; 30-34); the system (1) being characterized in that each coupling (40; 140; 340; 440) comprises a plastic tubular body (145; 345; 445), sealing means (41; 141; 341; 441) interposed between the tubular body (145; 345; 445) and the corresponding connector (36), and means (42; 142; 342; 442) for axial locking of the tubular body (145; 345; 445) with respect to its connector (36) in a defined axial position, in which the axial locking means (442) are snap-action locking means (453) that include an annulus of elastically deformable teeth (453) projecting radially outwards from the tubular body (445).

17. The system according to claim 16, in which said stop means (44; 144; 351; 451) comprise, on the coupling (40; 140; 340; 440), an annular shoulder (43) that interacts with the end surface (38) of the connector (36).

18. The system according to claim 16, in which the axial locking means (42; 142; 342; 442) are interference-fit means on the tubular body (145; 345; 445) that engage with the cylindrical housing (39).

19. The system according to claim 18, in which the axial locking means (142; 342) are made of metal.

20. The system according to claim 18, in which the axial locking means (142; 342) comprise a sleeve mounted in a fixed position on the tubular body (145; 345) and projecting radially outwards from said tubular body (145; 345).

* * * * *